Feb. 26, 1952     S. M. PYNE     2,587,382
WINDOW WASHER AND WIPER
Filed Feb. 2, 1950

Stafford M. Pyne
INVENTOR.

BY *Clarence A. O'Brien*
*and Harvey B. Jackson*
Attorneys

Patented Feb. 26, 1952

2,587,382

UNITED STATES PATENT OFFICE 2,587,382

WINDOW WASHER AND WIPER

Stafford M. Pyne, Detroit, Mich.

Application February 2, 1950, Serial No. 141,890

2 Claims. (Cl. 15—136)

1

This invention relates to window cleaning apparatus, and more particularly to a window washer and wiper having a fluid holding reservoir formed in the handle which cooperates with a rigid base on which the window engaging sponge together with a rubber wiper are rigidly secured.

An object of this invention is to provide a window washer and wiper in which the reservoir for holding fluid is in the handle in order that the apparatus may be more readily and easily balanced.

A further object of the invention is to provide a window cleaning apparatus having a completely hollow handle for retention of a larger amount of fluid without making the window washer more cumbersome.

Still another object of the invention is to provide a window washer having a fluid reservoir handle which is made from a resilient plastic material and which may be compressed to spray cleaning fluid upon the surface of a window to be cleaned.

Still another object of the invention is to provide a window washer and wiper having a base in which a hollow plastic handle is threadedly secured. By means of a plug having a spray orifice therein the resilient handle is rigidly held in threaded engagement with the guide block.

Still further objects of the invention reside in the provision of a window washer and wiper that is strong, durable, highly efficient in operation, simple in construction and manufacture, made from a minimum number of parts, capable of being made from various divergent materials, and quite inexpensive.

These, together with the various ancillary objects of the invention which will become apparent as the following description proceeds, are obtained by this window washer and wiper, a preferred embodiment of which has been illustrated by way of example only, in the accompanying drawings, wherein.

Figure 1:
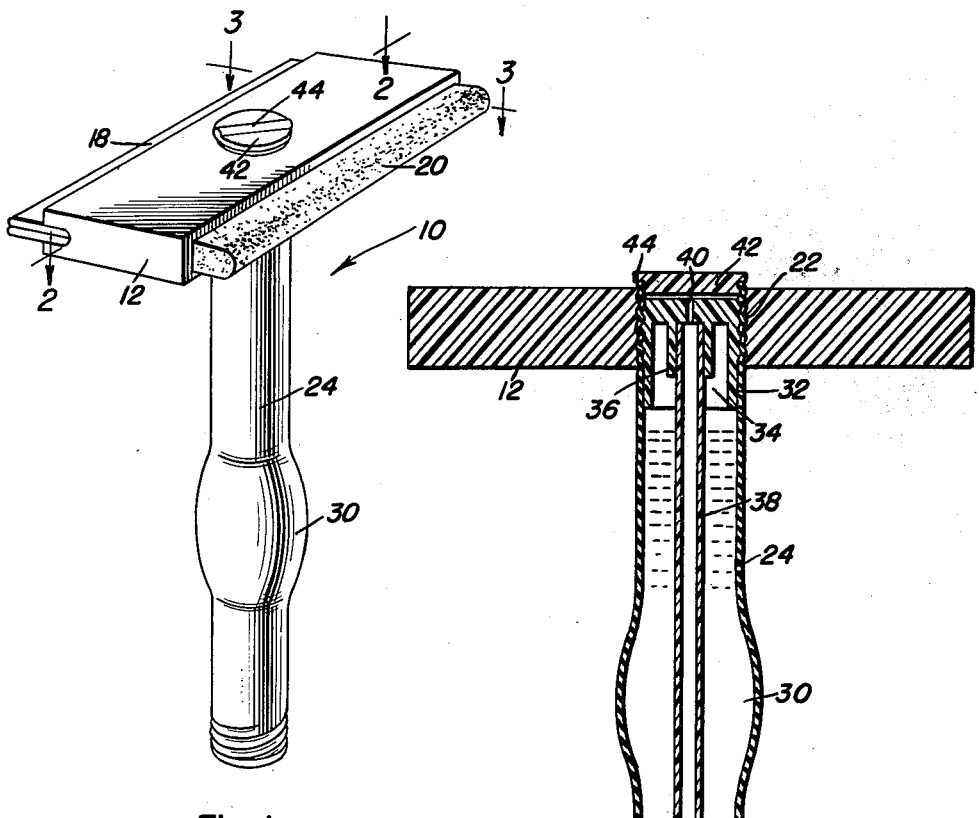
Figure 1 is a perspective view of the window washer and wiper comprising the present invention.
Figure 2:
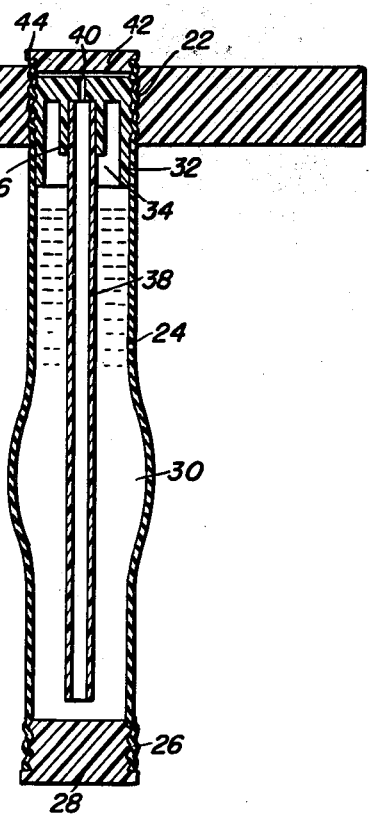
Figure 2 is a vertical sectional view as taken along line 2—2 of Figure 1.
Figure 3:
Figure 3 is a vertical sectional view as taken along line 3—3 in Figure 1.

With continuing reference to the accompanying drawings wherein like reference numerals designate similar parts throughout the various views, reference numeral 10 generally designates the window washer and wiper comprising the present invention. This window washer includes

2 a rigid base 12 having a recess 14 in one side thereof and having a double dovetail shaped groove 16 in the opposed side. The synthetic or natural rubber wiper blade 18 is secured in the recess 14 by a suitable adhesive or other convenient means. Within the double dovetail recess 16 is emplaced a sponge 20 which may be readily used in the well known manner to apply window cleaning fluid to the surface of a window.

The base 12 which may readily be made from a hard plastic material, though other materials may be readily used, is provided with a central threaded aperture 22. A resilient plastic handle 24 is threadedly engaged within the aperture 22. The handle 24 is preferably internally and externally threaded at the end engaged within the aperture 22 and the other end of the handle 24 is threaded as at 26 for reception of a capping plug or closure 28 which is detachably secured to the handle 24. Medially the ends of the handle, there is a portion 30 of greater diameter for increasing the capacity of the handle for cleaning fluid.

Since the handle 24 is quite resilient, the threads engaging the base at the threaded aperture 22 will tend to become loose and the base 12 may be sheared from engagement with the handle 24.

However, in order to avoid this possible shearing of the handle relative to the base, a plug 32 which is externally threaded is engaged in the handle 24. This plug is also encompassed by the base 12 and thus prevents the shearing of the base 12 relative to the handle because of its strong space-filling characteristics. The plug 32 is provided with an annular recess 34 into which an annular flange 36 extends. The collar 36 is provided with a recess in which a cylindrical liquid delivery tube 38 is secured. The tube 38 may be emplaced within the recess in the collar 36 by means of a friction fit. However, if desired, suitable adhesive may be used to rigidly secure the tube within the collar. In communication with the tube and in the plug 32 is formed a spray orifice 40. Thus, upon squeezing of the handle 24, cleaning fluid in the handle will be forced up through the tube 38 and out of the orifice 40. A cap 42 having a projection 44 for easier removal thereon is provided for closing off under the aperture 40 when the window washer is not in use.

This window washer may be made in any convenient size. For large store windows, the window washer may be made of substantially larger size than a window washer and wiper for home use. A yet smaller addition of the device may be used for storage in the glove compartment or trunk of an automobile for readily washing the automobile's window. Further, it has been found that the device is in fact satisfactory for washing the outer surface of a well finished automobile or other vehicle.

Since from the foregoing, the construction and advantages of this window washer and wiper are readily apparent, further description is believed to be unnecessary.

However, since numerous modifications will readily occur to those skilled in the art after a consideration of the foregoing specification and accompanying drawing, it is not intended to limit the invention to the precise embodiment shown and described, but all suitable modifications and equivalents may be resorted to which fall within the scope of the appended claims.

Having described the invention, what is claimed as new is:

1. A window washer and wiper comprising a rigid base provided with a straight side edge together with means of fastening a window contacting element to said straight side edge, said base having a threaded aperture extending therethrough, a tubular flexible handle having internal and external threads at one end, the external threads being connected with the threads of said threaded aperture thereby connecting said handle to said base, a threaded plug secured to the internal threads of said handle and encompassed by said handle, said plug having a spray orifice with a longitudinal axis perpendicular to said side edge to deliver liquid at right angles to said edge, a closure secured to the end of said handle opposite from that end which is connected with said base, and a liquid delivery tube secured to said plug in communication with said spray orifice and being concentrically arranged with said handle.

2. The combination of claim 1 and said base having upper and lower surfaces, said plug having a portion thereof extending below said lower surface to provide rigidity at the junction of said handle and said base.

STAFFORD M. PYNE.

REFERENCES CITED

The following references are of record in the file of this patent:

UNITED STATES PATENTS

| Number | Name | Date |
| --- | --- | --- |
| 521,246 | Perry | June 12, 1894 |
| 1,718,117 | Daindos | June 18, 1929 |
| 1,766,529 | Pierson | June 24, 1930 |
| 2,017,422 | Shonnard | Oct. 15, 1935 |
| 2,064,584 | Aronson | Dec. 15, 1936 |